(12) United States Patent
Bankemper et al.

(10) Patent No.: US 6,182,244 B1
(45) Date of Patent: *Jan. 30, 2001

(54) SYSTEM AND METHOD FOR AUTOMATICALLY INITIATING A TRACING FACILITY AND DYNAMICALLY CHANGING THE LEVELS OF TRACING CURRENTLY ACTIVE

(75) Inventors: Michael Francis Bankemper, Tucson; James Mitchell Ratliff, Benson; Ronald Preston Ward, Tucson, all of AZ (US); Michael William Wood, Oakwood Grove (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/926,953

(22) Filed: Sep. 10, 1997

(51) Int. Cl.⁷ ................................ H02H 3/05; H04L 1/22

(52) U.S. Cl. ................ 714/38; 714/45; 712/227

(58) Field of Search .................... 714/38, 42, 45, 714/48; 712/227, 216; 364/267; 395/701, 704

(56) References Cited

U.S. PATENT DOCUMENTS

| | | |
|---|---|---|
| 3,659,272 | 4/1972 | Price et al. .................. 340/172.5 |
| 4,205,370 * | 5/1980 | Hirtle .................................. 714/45 |
| 4,462,077 * | 7/1984 | York ................................... 714/45 |
| 4,533,997 | 8/1985 | Ferguson ........................... 364/200 |
| 4,802,165 * | 1/1989 | Ream ................................. 714/45 |
| 4,954,942 * | 9/1990 | Masuda et al. ................... 714/45 |
| 5,067,073 * | 11/1991 | Andrews ........................... 714/38 |
| 5,119,377 * | 6/1992 | Cobb et al. ....................... 714/38 |
| 5,210,859 * | 5/1993 | Aoshima et al. ................. 709/300 |
| 5,347,649 | 9/1994 | Alderson ........................... 395/600 |
| 5,513,317 | 4/1996 | Borchardt et al. ............ 395/183.21 |
| 5,764,885 * | 6/1998 | Sites et al. ........................ 714/45 |

* cited by examiner

*Primary Examiner*—Dieu-Minh T. Le
(74) *Attorney, Agent, or Firm*—Donald J. Pagel

(57) ABSTRACT

A method for collecting information about the operating condition of a computer system. The method comprises the steps of running a first trace program that collects information about the operating condition of the computer and, in response to the detection of an error in the operating condition of the data storage system by the first program, determining whether a first flag is on or off. The first flag indicates whether or not a second trace program should be run. If the first flag is on, the second program is run. The second trace program is designed to collect different information about the operating condition of the computer system than the first trace program collects.

14 Claims, 2 Drawing Sheets

SYSTEM AND METHOD FOR AUTOMATICALLY INITIATING A TRACING FACILITY AND DYNAMICALLY CHANGING THE LEVELS OF TRACING CURRENTLY ACTIVE

TECHNICAL FIELD

The present invention relates to a trace facility used to troubleshoot a software-controlled system and more particularly to a trace facility that automatically collects different amounts of information depending on the particular situation.

BACKGROUND ART

It is well-known in the art to monitor the operating condition of a computer system through the use of a troubleshooting program known as a trace program. Typically, a standard set of trace entries will resolve the majority of problems encountered in the operation of the computer system. However, the creation of a trace entry requires a certain amount of memory in the central processing unit (CPU) of the system. Hence, in order to minimize the amount of CPU memory utilized by the standard trace program, the size of trace programs is usually kept small. This limits the type of information that can be collected by the standard trace program. Additionally, a larger trace program would slow down the performance of the operating system of the computer system.

SUMMARY OF THE PRESENT INVENTION

Briefly, the present invention comprises a method for collecting information about the operating condition of a computer system. The method comprises the steps of running a first (or standard) trace program that collects information about the operating condition of the computer and, in response to the detection of an error by the first program, determining whether a first flag is on or off. The first flag indicates whether or not a second (or enhanced) trace program should be run. If the first flag is on, the second program is run. The second trace program is designed to collect different information about the operating condition of the computer system than the first trace program collects.

Additional levels of information about the operating condition of the computer system can be obtained through the use of a second or additional flags, with each of the additional flags being linked to additional trace programs which provide different types of information about the operating condition of the computer system. The flags can be turned off either manually, through commands issued by an operator, or automatically in response to predetermined events recognized by the software.

DETAILED DESCRIPTION OF THE PREFERRED EMBODIMENT

Figure 1:
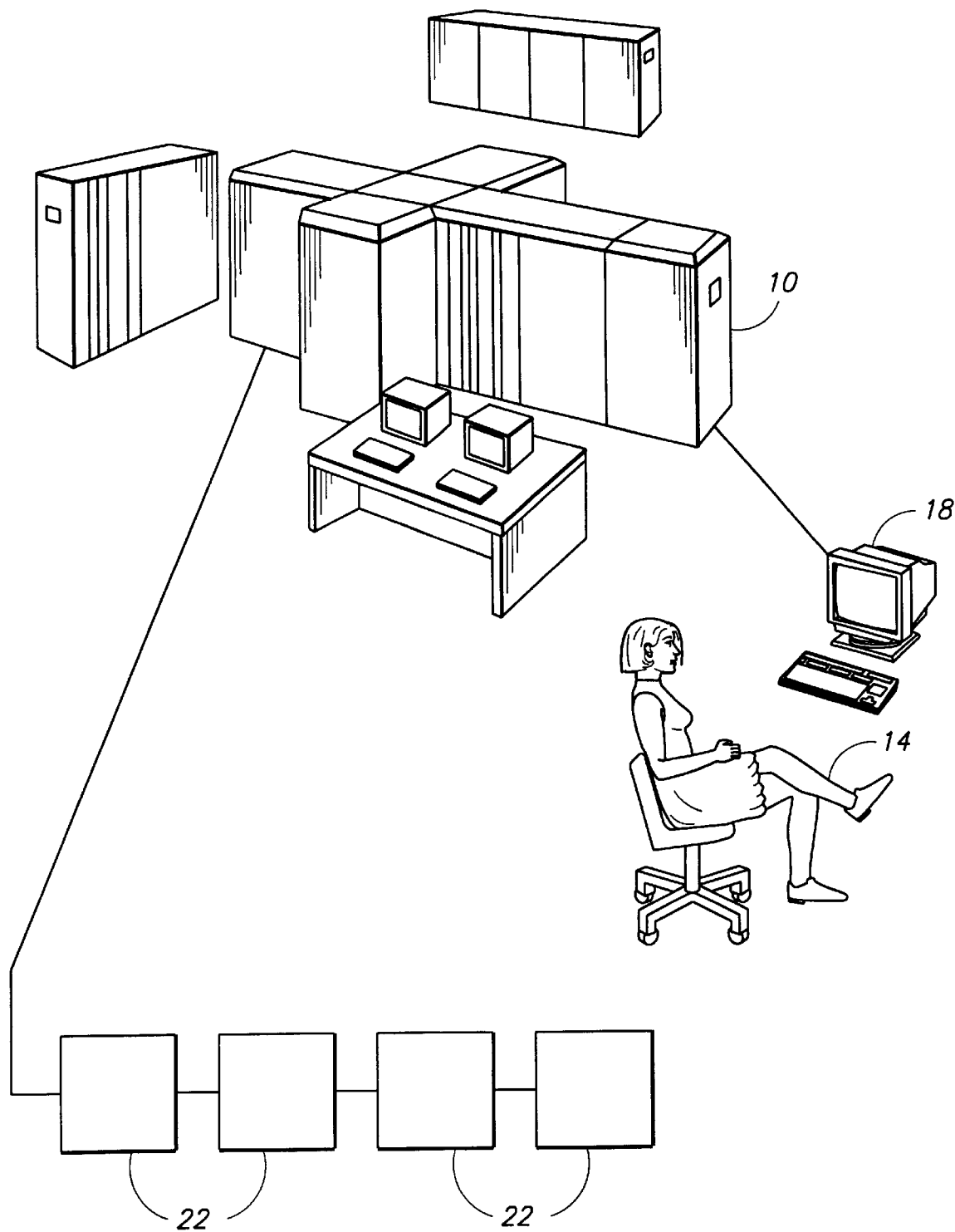
FIG. 1 is a schematic diagram of a computer system that utilizes a trace facility according to the present invention.

FIG. 1 illustrates a mainframe computer 10 that is accessible by a user 14 using a workstation 18. The mainframe computer 10 is connected to at least one peripheral device 22, such as a data storage device. Generally, a plurality of the devices 22 are connected to the computer 10. In the preferred embodiment, the computer 10 is a machine like an IBM S/390 computer operating under IBM's Data Facility Storage Management Subsystem (DFSMS) environment, and the device 22 is a tape drive. In other embodiments, other computer systems can be used as the computer 10, other operating environments can be used and other types of devices can be substituted for the device 22. such as an optical disk drive or a direct access storage device.

Figure 2:
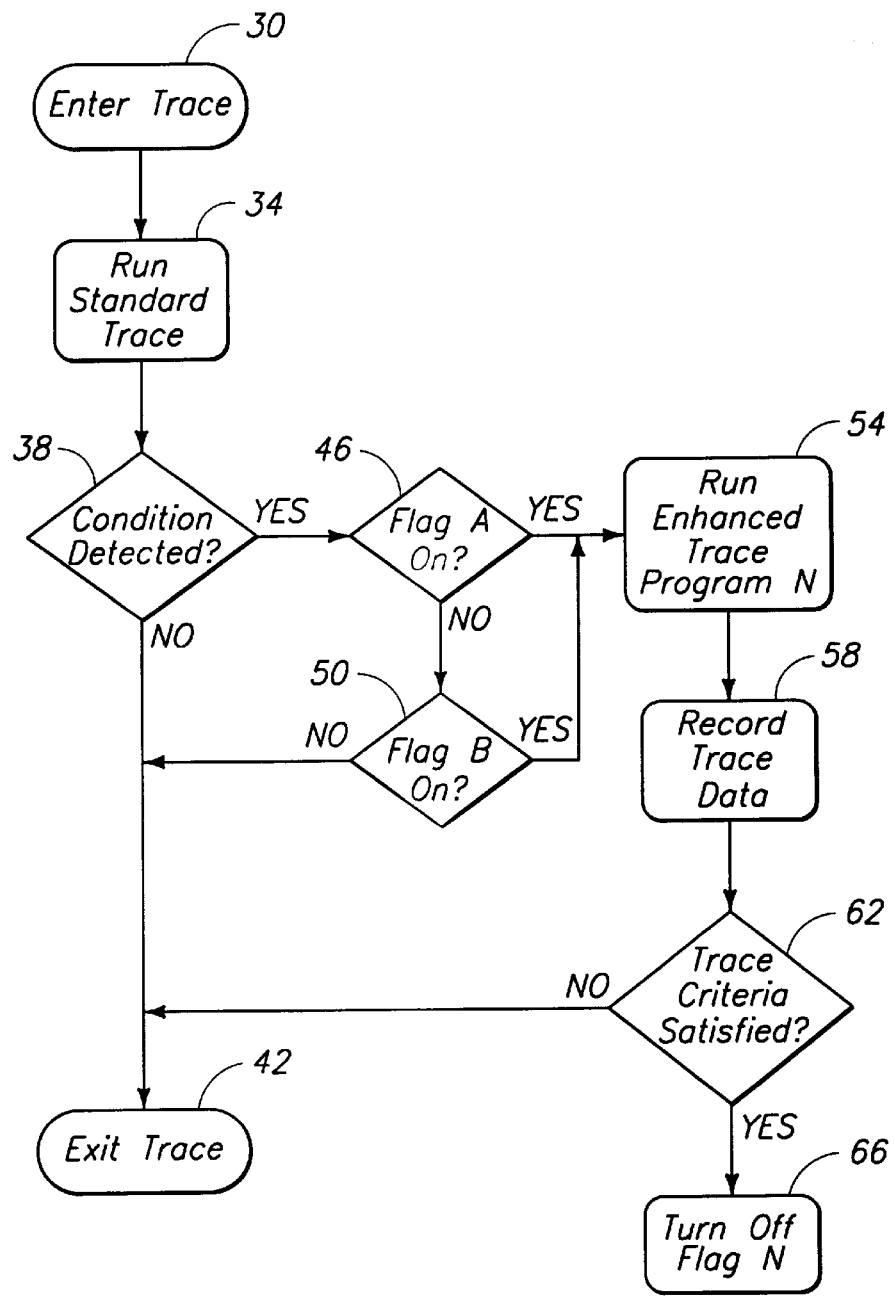
FIG. 2 is a flowchart that illustrates the trace facility according to the present invention.

FIG. 2 is a flowchart that illustrates the method of the present invention. In block 30, a trace point in the system software is encountered. Block 34 indicates that a standard trace program is executed. The standard trace program is a program that collects information about the operating condition of the data storage system, generally for the purpose of providing information that can be used to troubleshoot or debug software and/or hardware.

Block 38 indicates that when the standard trace program is running, occasionally, information about one or more types of predetermined conditions may be detected. For example, the information could be a type of error message. Alternatively, it could be information indicative of an unusual event like a larger than normal number of records or some other occurrence. If a predetermined condition is not detected at block 38, then the standard trace program executes normally and is exited as indicated by block 42.

Block 46 indicates that if one of the predetermined conditions is detected in block 38, then a first flag (flag A) is checked. If flag A is not on, then block 50 indicates that a second flag (flag B). If flag B is not on, then the program returns to its normal execution pathway through block 42. In the preferred embodiment, at this point the standard trace program will have finished executing. However, in other embodiments, the standard trace program could still need to finish executing. It should also be noted that in alternative embodiments, flag B could be deleted so that if flag A is not on, the program returns to its normal execution pathway through block 42. Additionally, after flap B, there could be "N" number of additional flags that are checked for "on" or "off" status in the same way that flags A and B are checked. Typically, the flags are turned on and off with a single bit of code. However, other techniques for controlling the flags can be used.

If block 46 indicates that flag A is on, then an enhanced trace program is executed at block 54. The enhanced trace program is similar to the standard trace program in that it is a program that collects information about the operating condition of the data storage system, generally for the purpose of providing information that can be used to troubleshoot or debug software and/or hardware. However, the enhanced trace program collects more information than the standard trace program. In other words, the purpose of the enhanced trace program is to collect more detailed information about the operating condition of the data storage system when the predetermined condition is detected by the standard trace program.

The purpose of the flags A and B (and possibly "N" additional flags) is to allow more detailed trace information to be collected without permanently degrading the performance of the operating system. Because of the increased number of instructions associated with the enhanced trace programs, the performance of the operating system would be degraded if the enhanced trace programs ran continuously. Therefore, the flags A through N are used so that the enhanced trace programs are only turned on when they are needed or at certain predetermined intervals.

Example 1, below, compares a standard trace program and an enhanced trace program for an input/output (I/O) event.

EXAMPLE 1

Standard I/O Trace: Lock; Get Record; Unlock.

Enhanced I/O Trace: Lock; Prepare Key GE Shared; Point to Record; Get Record; Decompress Record; Retrieve from Buffer; Journal Put; Update Control Record; Commit Journal Update; Unlock; End Request.

Block 58 illustrates that after the enhanced trace program has collected some or all of the desired information, the information is stored for future use. In the preferred embodiment, the information is initially written into a trace-wrap buffer. When a predetermined number of records are present in the trace-wrap buffer, the records are written to a permanent trace file on a direct access storage device (DASD). Subsequently, the end user archives the records in the permanent trace file on a tape drive. Of course, other storage methodologies could be used.

Block 62 indicates that after the enhanced trace program has been executed, a trace criteria is examined to determine if the flag for the enhanced trace program should be turned off. In the preferred embodiment, the trace criteria is a period of time that indicates how long the enhanced trace program has been executing. For example, if a specified enhanced trace program has been executing for thirty minutes, the relevant flag will be turned off, thereby stopping the specified enhanced trace program from executing on the next cycle of the operating system. In other embodiments, other trace criteria could be used. For example, the number of times the enhanced trace program has executed is an acceptable trace criteria for use at block 62.

Block 66 indicates that if the trace criteria from block 62 is satisfied, then the flag is turned off. If the trace criteria has not been satisfied, then the flag remains on and the enhanced trace program exits to the operating system through block 42. Because the flag is still on, the enhanced trace program will execute again if block 46 is encountered.

With respect to blocks 46 and 50, it should be noted that the flags A and B (and N other flags, if relevant) can be turned on either manually or automatically. In the preferred embodiment, the flags A through N are turned on automatically when a particular type of error situation is encountered by the operating system. This is referred to as dynamic activation of the enhanced trace program. For example, code associated with block 38 can automatically turn on one or more of the flags A through N. Alternatively, the flags A through N can be turned on manually by a command issued by the user 14 from the workstation 18.

With respect to block 54, in the preferred embodiment there are two types of enhanced trace programs that can be utilized. The first type is referred to as a zone program. With zone programs, the same enhanced trace program is run regardless of which of the flags A through N initiates the enhanced trace program. In other words, the flags A through N are positioned at various locations or zones throughout the operating system. Whenever an active flag A–N is encountered, the same enhanced trace program is run.

The second type of enhanced trace program is referred to as a level program. With level programs, a different enhanced trace program is activated by each of the flags A through N. Flag A activates enhanced trace program A; flag B activates enhanced trace program B; and flag N activates enhanced trace program N. Each of the enhanced trace programs A through N differ in some respect, such as the amount or type of information that is collected about the operating condition of the data storage system. So, for example, enhanced trace program A might collect more data about an I/O error than the standard trace program, and enhanced trace program B would collect more data about the I/O error than enhanced trace program A. The use of level programs allows different amounts or types of data to be collected depending on the nature of the problem.

In block 54, the phrase "enhanced trace program N" is used to indicate that the enhanced trace program can be either the zone type, in which case N is the same for each of the flags A through N, or the level type, in which case N corresponds to the flag the activates the enhanced trace program. Similarly, the "N" in block 66 is related to the zone or level flag that activates the enhanced trace program. As mentioned previously, the flags for zone or level programs can be activated either dynamically or manually.

The steps involved in the method of a preferred embodiment of the present invention can be summarized as follows:

EXAMPLE 2

1. Running a first program that collects information about the operating condition of a data storage system;

2. In response to the detection of an error in the operating condition of the data storage system by the first program, checking a first flag to determine if a second program should be run;

3. Running the second program if the first flag indicates that the second program should be run, the second program being designed to collect different information about the operating condition of the data storage system than the first program collects;

4. If the first flag indicates that the second program should not be run, checking a second flag to determine if the second program should be run;

5. Running the second program if the second flag indicates that the second program should be run;

6. If the second program is run, storing at least some of the information collected by the second program;

7. Checking a predetermined parameter to determine if one or more of the flags should be turned off; and 8. Returning to the operating system if the second program is not run or if the second program is finished running.

It should be appreciated that the processes illustrated in Examples 1 and 2 and in FIG. 2, represent functions that are implemented in software. There are many ways to write computer code that will allow these functions to be implemented as is known by those skilled in the art.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for gathering trace information from a data storage system comprising:

while system software is running on a computer, executing a first trace program that collects information about the operating condition of a data storage system associated with the computer, the first trace program being activated when a trace point in the system software is encountered;

in response to the detection of a predetermined condition in the operating condition of the data storage system by the first trace program, determining whether a first flag is on or off, the first flag indicating that a second trace program should be executed if the first flag is on and that the second trace program should not be executed if the first flag is off; and executing the second trace program if the first flag is on, the second trace program being designed to collect more detailed information about the operating condition of the data storage system than the first trace program collects.

2. The method of claim 1 further comprising:

if the first flag is on, turning off the first flag after the occurrence of a predetermined event.

3. The method of claim 2 wherein the predetermined event is the passage of an amount of time.

4. The method of claim 2 wherein the predetermined event is a number of times that the second program has been executed.

5. The method of claim 1 wherein the data storage system is a system that manages removable media drives for mainframe computers.

6. The method of claim 1 further comprising:

if the first flag is off, determining whether a second flag is on or off, the second flag indicating that a third trace program should be run if the second flag is on and that the third trace program should not be run if the second flag is off; and executing the third trace program if the second flag is on, the third trace program being designed to collect different information about the operating condition of the data storage system than either the first trace program or the second trace program collects.

7. The method of claim 6 further comprising:

if the second flag is on, turning off the second flag after the occurrence of a predetermined event.

8. The method of claim 7 wherein the predetermined event is the passage of an amount of time.

9. The method of claim 7 wherein the predetermined event is a number of times that the third program has been executed.

10. The method of claim 1 further comprising:

storing the information collected by the second trace program in the memory of the computer.

11. The method of claim 1 wherein the first flag is turned on automatically in response to a predetermined event.

12. The method of claim 1 further comprising:

if the first flag is off, determining whether a second flag is on or off, the second flag indicating that the second trace program should be run if the second flag is on and that the second trace program should not be run if the second flag is off; and executing the second trace program if the second flag is on.

13. A system for gathering trace information from a data storage system comprising:

a computer;

a plurality of data storage devices connected to the computer;

a first trace program running on the computer for collecting information about the operating condition of one or more of the plurality of data storage devices;

a second trace program stored on the computer that collects different information about the operating condition of the plurality of data storage devices than the first trace program when the second trace program is running; and first flag means for indicating that the second trace program should be run if the first flag is on and that the second trace program should not be run if the first flag is off, the first trace program checking whether the first flag means is on or off when the first trace programs detects an error in the operating condition of one or more of the data storage devices.

14. The system of claim 13 wherein the plurality of data storage devices comprise tape drives.

* * * * *